H. A. BRANDENBURGER.
TIRE.
APPLICATION FILED OCT. 15, 1913.
1,122,249.
Patented Dec. 29, 1914.
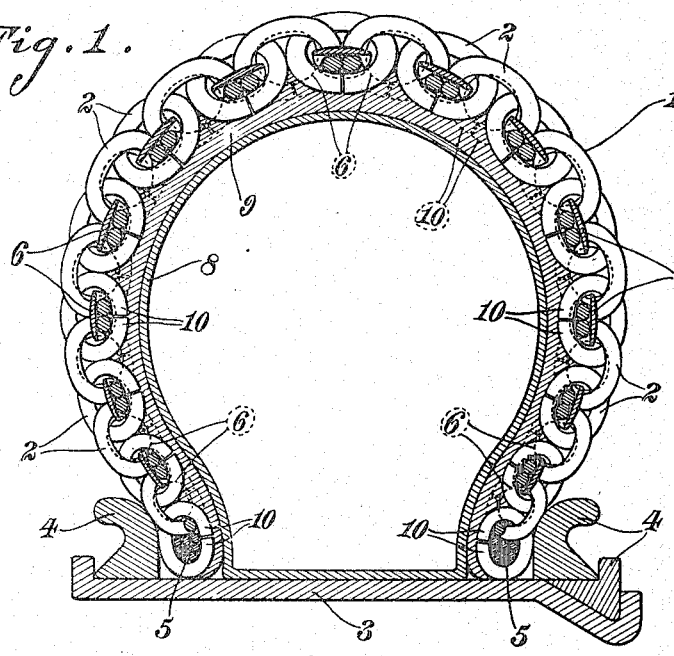
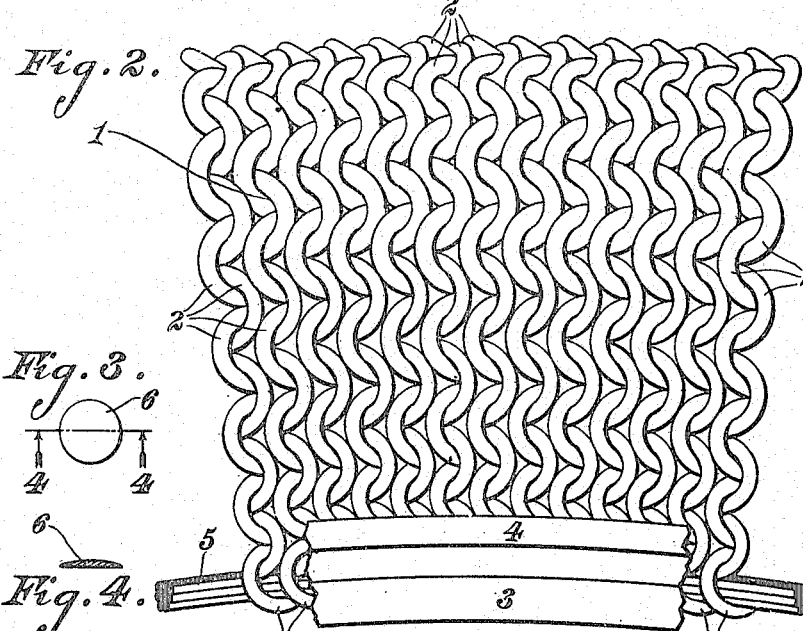
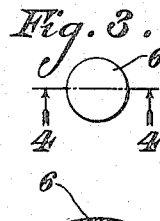
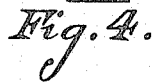
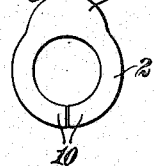
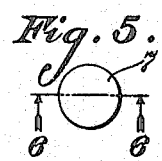
Witnesses:
Harry H. Reiss.
George G. Anderson.
Inventor:
Herman A. Brandenburger,
By Hugh K. Wagner,
His Attorney.

UNITED STATES PATENT OFFICE.

HERMAN A. BRANDENBURGER, OF ST. LOUIS, MISSOURI.

TIRE.

1,122,249.
Specification of Letters Patent.
Patented Dec. 29, 1914.

Application filed October 15, 1913. Serial No. 795,259.

*To all whom it may concern:*

Be it known that I, HERMAN A. BRANDENBURGER, a citizen of the United States, residing at the city of St. Louis, State of Missouri, have invented certain new and useful Improvements in Tires, of which the following is a specification.

This invention relates to tires for motor vehicles and the like, and has for its primary object to provide certain new and useful improvements in the tires disclosed in my United States Letters Patent No. 1,031,416, granted July 2, 1912, and No. 1,034,066, granted August 6, 1912.

To this end, the present invention consists in an improved tire of the character described which has an outer casing or armor formed of an improved metallic fabric, which possesses great strength and the qualities of flexibility and impenetrability and prevents skidding, the inner wall of which casing or armor is filled and coated with an improved waterproof, flexible, and lubric composition to protect the inner tube from the metallic fabric and, also, to prevent blowouts.

Further, the present invention consists of the novel features of construction and arrangement of parts hereinafter more fully described and pointed out in the claims.

In the accompanying drawings forming part of this specification, in which like numbers of reference denote like parts wherever they occur, Figure 1 is a transverse sectional view of an automobile tire embodying the present invention; Fig. 2 is a fragmentary side elevation of a portion of the tire; Fig. 3 is a plan view of one of the filling pieces; Fig. 4 is a sectional view on the line 4—4, Fig. 3; Fig. 5 is a plan view of an alternative form of filling piece; Fig. 6 is a sectional view on the line 6—6, Fig. 5; and Fig. 7 is a plan view of an alternative form of ring to be used in the tread of the chain casing.

As shown in the drawings, the outer casing or armor 1 is composed of series of rows of rings 2 connected or interwoven together in much the same manner as a so-called coat of chain mail. The rings 2 are preferably formed of spring steel wire and are arranged in annular rows, being graduated in diameter from the largest which form the middle row or rows in the tread to the smallest which form the rows at the rim so that there are the same number of rings in each row, and the gage of the wire being, also, graduated from the largest of which the largest rings are formed to the smallest of which the smallest rings are formed. The casing or armor 1 constructed as just described is in the form of a continuous band and naturally assumes the form of what is commonly called a "straight side" casing, which may be mounted on the felly 3 of a wheel and locked and held securely thereon by the clamp rings 4 in the usual manner. As a means for retaining the casing or armor 1 in its natural form and, also, for holding same on the felly 3 of the wheel, as well as for strengthening same, each row of rings 2 at its rim is provided with an annular core 5, which may be formed by passing a wire several times through the rings 2 in said row at the rim and then welding or otherwise securing the ends of the wire together, or, if desired, each core may be formed of a small wire cable, or a solid continuous ring (not shown in the drawings), or other suitable means.

The interstices between mutually-adjacent rings are designed to receive filling pieces, which latter are preferably in the form of plano-convex metal disks 6 having convex outer faces and flat or plane inner faces as depicted in Figs. 3 and 4, though, if desired, concavo-convex or bell-shaped disks 7 having convex outer faces and concave inner faces as shown in Figs. 5 and 6, or disks like those disclosed in my above-mentioned patents may be used. These filling pieces, like the rings 2, are graduated in size from the largest which fill the interstices between the rings in the middle of the tread to the smallest which fill the interstices between the rings adjacent to the rim of the casing, and are held in place solely by the rings themselves, the latter being so closely interwoven as to require no extraneous retaining means.

The chain-and-disk casing or armor 1 constructed as hereinabove described is not only strong and endurable, but possesses the qualities of flexibility and impenetrability that render it particularly well adapted for automobile tire casings, though it should be understood that this chain-and-disk fabric may be used in the manufacture of mesh purses and bags, door-mats, conveyer belting, and for various other purposes.

In order to protect the inner tube 8 from the chain fabric, the inner wall of the casing or armor 1 is covered with a coating or lining 9 of a waterproof, flexible, and lubric composition, which constitutes the subject-matter of my other application filed of even date and consists of rubber cement, a hydrocarbon, preferably benzene, and graphite thoroughly mixed together, preferably in the proportions of substantially equal parts of rubber cement and graphite and sufficient benzene to make the composition viscous so that it can be applied to the inner wall of the casing or armor by a brush or other suitable means (not shown). When this composition is applied in a viscous state to the inner wall of the casing or armor 1 to form the coating or lining 9, it runs into and fills all the cracks, crevices, and interstices in the inner wall of said casing or armor and thereby so amalgamates with the chain-and-disk armor as to form as much an integral fabric as is rubber-coated canvas or other reticulated material. When this coating or lining dries or sets, it is irremovable and is most intimately associated with the rings and disks, due to the fact that it runs into all the interstices in the inner wall of the casing or armor while it is in a viscous condition, the outward pressure of the inflated inner tube 8 affording additional means for preventing the coating or lining 9 from becoming separated from the chain-and-disk fabric. This coating or lining 9 hardens sufficiently to prevent blowouts, and is rendered waterproof and flexible by the rubber cement present in same, while the graphite acts as a lubricating agent which prevents abrasion of the inner tube.

It will be observed that the outer wall of the casing or armor 1, instead of being covered with rubber as in my above-mentioned patents, is left bare, whereby the metallic tread prevents the tire from skidding. As shown in the drawings, each ring 2 is formed of a piece of wire bent in an annular shape and having its ends 10 nearly abutting, and is arranged so that said ends are located in the inner wall of the casing or armor 1. By this arrangement, when the composition is applied to the inner wall of the casing or armor 1 to form the coating or lining 9 as hereinabove described, some of the composition enters between the nearly abutting ends 10 of the rings 2 and, when it dries or sets, retains the ends 10 of the rings in the inner wall of the casing or armor and prevents said rings from working around, with the result of preventing the ends 10 from becoming exposed in the outer wall of the casing or armor and, also retaining each ring in such position that only the middle portion intermediate the ends 10 thereof is exposed. This arrangement, in conjunction with the fact that the rings are formed of spring steel wire, increases the longevity and strength of the casing or armor 1, as the ends 10 of the rings 2, being located in the inner wall of the casing or armor, are prevented from spreading apart which spreading would, obviously, be apt to occur if the ends 10 of the rings were exposed in the outer wall of the casing or armor. It should be understood, however, that the ends 10 of the rings 2 may be welded or otherwise secured together to form continuous rings, if so desired.

In the tire illustrated in the drawings, it will be seen that the tread portion of the casing or armor 1 is relatively round, this being due to the fact that same has only one annular row of rings 2 of the largest size located in the middle of the tread. If, however, it is desired to form a casing or armor 1 which will have a relatively flat tread, it is only necessary to locate a plurality of annular rows of rings of the largest size in that particular portion of the casing or armor.

In order to provide for longer wearing purposes and thereby increase the longevity of the casing or armor 1, the middle or exposed part of each ring 2 in the tread of same may be provided with a protuberance or raised lug 11, as depicted in Fig. 7, or it may be made relatively thicker than the unexposed part of same.

While, for the purpose of illustration, the rings 2 are connected and interwoven in such manner as to form a casing or armor 1 of the "straight side" type, yet, it should be understood that the rings may be so connected and interwoven as to form a casing or armor of the "clencher" type.

I claim:

1. A fabric consisting of interwoven rings, and a coating therefor composed of a mixture of substantially equal parts of rubber cement and graphite.

2. A tire provided with an outer casing consisting of chain fabric having filling disks inserted in the interstices, and a lining for said casing composed of a mixture of substantially equal parts of rubber cement and graphite.

In testimony whereof I hereunto affix my signature in the presence of two witnesses.

HERMAN A. BRANDENBURGER.

Witnesses:
GEORGE G. ANDERSON,
WALTER C. GUELS.